June 21, 1927.  
E. J. KOFFORD  
ELEVATING PLATFORM FOR TRUCKS  
Filed June 11, 1926

Inventor  
EARL J. KOFFORD

Attorney

Patented June 21, 1927.

1,633,024

UNITED STATES PATENT OFFICE.

EARL J. KOFFORD, OF DENVER, COLORADO, ASSIGNOR TO DENVER ICE & COLD STORAGE COMPANY, OF DENVER, COLORADO, A CORPORATION OF COLORADO.

ELEVATING PLATFORM FOR TRUCKS.

Application filed June 11, 1926. Serial No. 115,228.

This invention relates to a device for elevating material from the body of a truck, and is more particularly applicable for use in icing refrigerator cars when the cars are not convenient to the icing dock of the ice plant. The device will transport a load of ice to a position adjacent the car and elevate the cakes above the car roof, from which position, they may be slid by gravity into the icing doors.

The invention is, of course, not limited to this use but will be valuable for any use where it is desired to load or unload a truck from or to an elevated position.

The principal object of the invention is to provide a device of this character which will not interfere with the usual loading of the truck and which will elevate a portion of the load to a comparatively high elevation by means of a relatively small movement of a hydraulic ram.

Another object of the invention is to so construct the device that, when in the folded position, it will occupy a minimum of space so that it will not interfere with the truck passing through the usual necessary spaces such as garage doors and the like.

A further object is to provide a device which will be entirely enclosed by the truck body and will have no projections beyond the body.

Other objects and advantages reside in the detail construction of the invention, which is designed for simplicity, economy and efficiency. These will become more apparent from the following description.

In the following detailed description of the invention, reference is had to the accompanying drawings which form a part hereof. Like numerals refer to like parts in all views of the drawings and throughout the description.

In the drawings:

Fig. 1 is a side elevation of a portion of an automobile truck with the invention in place thereon. In this view, one side of the truck body has been broken away to disclose the mechanism and in broken line in this view the elevating platform is illustrated in a partially elevated position. The system of sheaves and cables illustrated in this elevation is an exact repetition of a similar system of sheaves and cables upon the opposite side of the truck.

Figure 1:
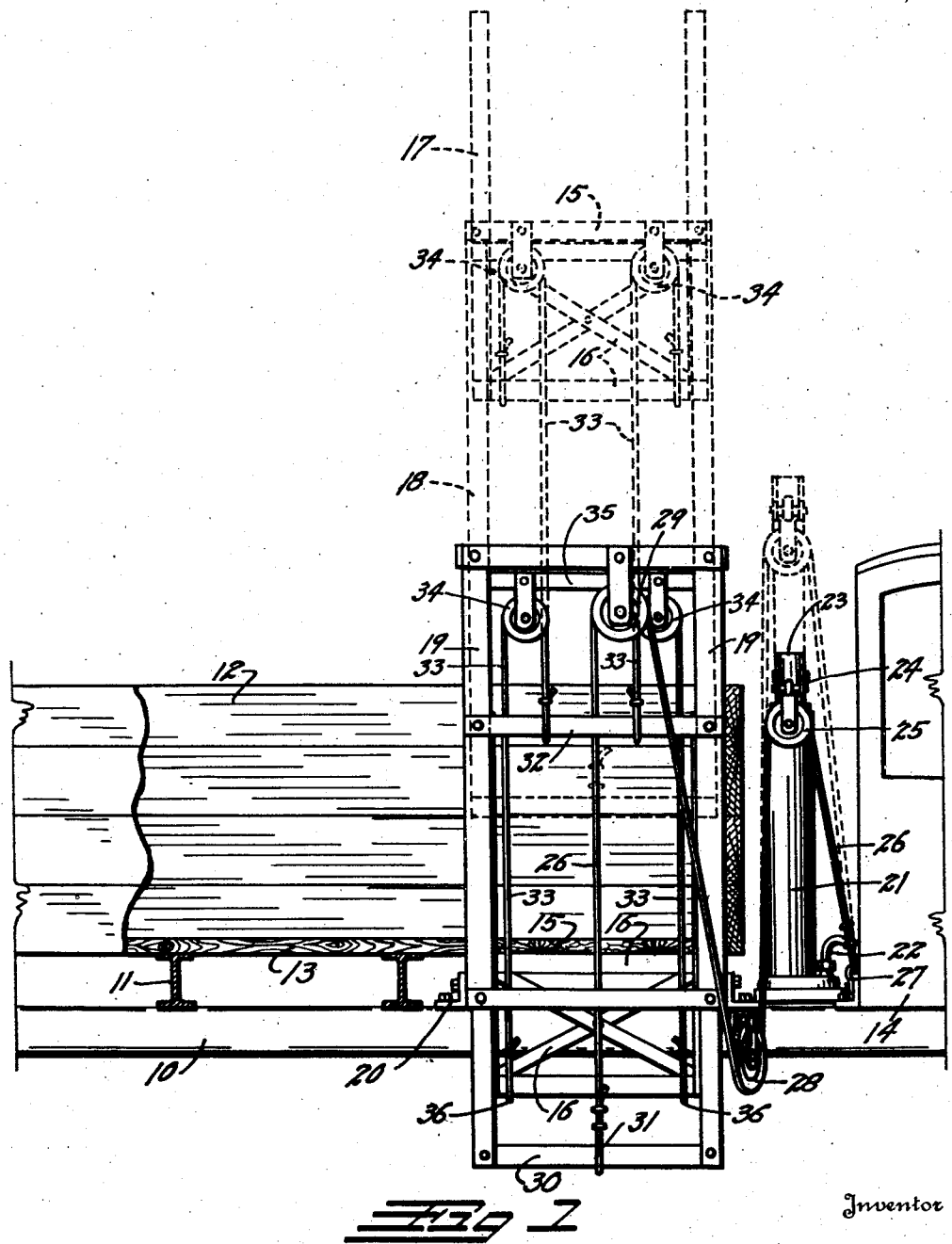

In the drawings, the truck chassis is illustrated at 10 with cross sills 11 supporting the floor 13 of a truck body 12 and operator's cab 14.

Figure 2:
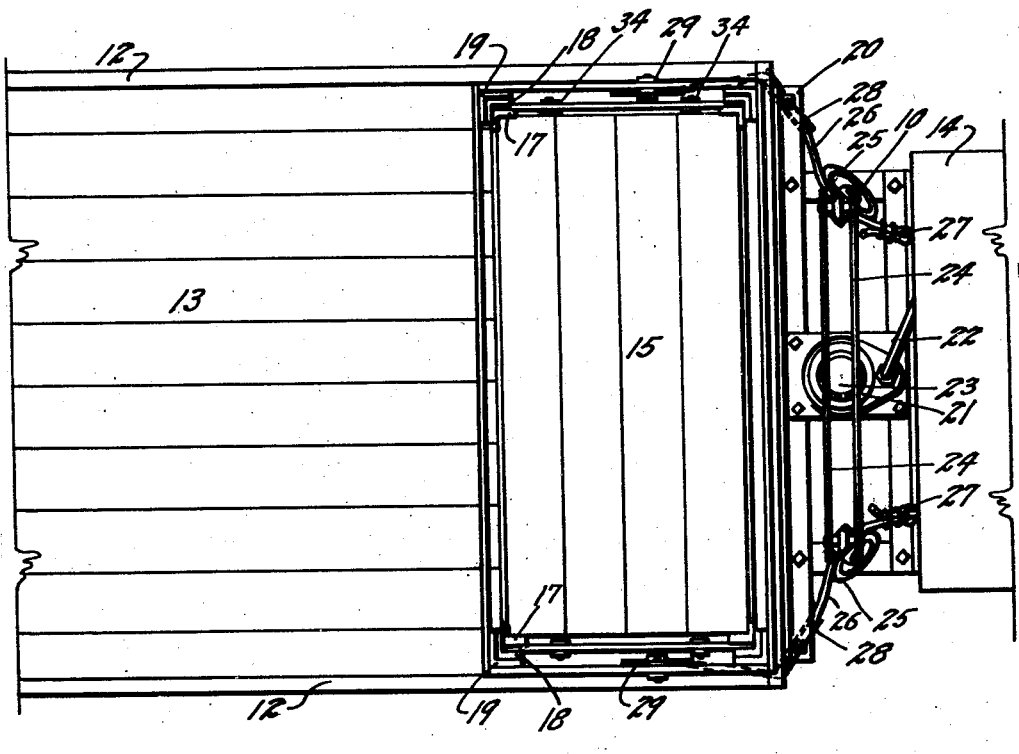
Fig. 2 is a plan view of the invention applied to a truck.
Figure 3:
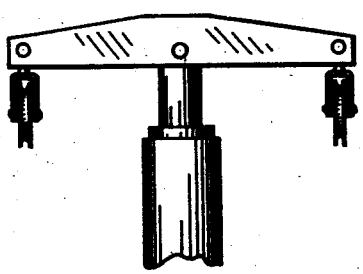
Fig. 3 is a detail front elevation of the operating ram.

Normally in alignment with the floor 13, is an elevating platform 15. The platform 15 is carried on a truss 16 from an inner angle iron frame 17. This inner frame 17 is vertically slidable in a similar, secondary frame 18, which is also vertically slidable in an outer stationary frame 19. The stationary frame 19 is carried by the chassis 10 on angle bars 20 and project therebelow, as shown in Fig. 1. The three frames 17, 18 and 19, each consist of four vertical angle iron posts connected by suitable bracing. At each corner the posts of each frame are nested within each other as illustrated in Fig. 2.

Between the body 12 and the cab 14, a hydraulic ram 21 is carried. This ram is of any of the usual constructions employed in self-dumping trucks and is operated from the truck engine and a pressure pump (not shown) through a pressure line 22. The piston rod of the ram, illustrated at 23, carries a T-head 24, from each extremity of which, a pulley 25 depends. Two main cables 26 extend from a fixed connection 27 on the chassis 10 upward over the pulleys 25 and downward under fixed pulleys 28 arranged at each side of the chassis secured to one of the angle bars 20. From the pulleys 28, the cables 26 again extend upward over third pulleys 29 carried at the top and each side of the outer frame 19, and downward terminating in a lower cross bar 30 at each side of the outer frame 19, as shown at 31.

From cross bars 32 at each side of the outer frame 19, two secondary cables 33 extend upward over a pair of sheaves 34 carried by an upper member 35 of the secondary frame 18. From the sheaves 34, the secondary cables 33 extend downward to a fixed connection at 36 on a lower member of the truss 16 supporting the elevating platform 15.

In operation, that portion of the load which it is desired to elevate is placed upon the platform 15 and fluid pressure from the power line 22 is turned into the ram 21. This causes the ram piston rod 23 to move upwardly, drawing on the main cables 26, which, since they are fixed at 27, will draw the secondary frame 18 upwardly. The movement of the secondary frame, because of the fixed connection at 27, of the main cable 26, will be twice as great as the movement of the piston rod 23.

As the secondary frame moves upward, it will raise the sheaves 34 and draw upon the secondary cables 33 which, being fixed at 32, will raise the truss 16 and the elevating platform 15. Since this system of cables and sheaves is similar to that of the main cables, the elevating platform will move upwardly twice the distance that the secondary frame 18 moves upwardly and correspondingly four times as far as the piston rod 23 moves upwardly. The average lift for a vehicle ram, such as illustrated at 21, is approximately three feet. This gives a lift to the elevating platform 15 of twelve feet above the floor 13, which is sufficient for use in icing refrigerator cars.

When in the lowered position, the frame 17 and 18 will be entirely enclosed within, and protected by, the outer frame 19. The outer frame 19 is entirely enclosed within the truck body 12 so that the liability of injuring the mechanism by accident is remote.

While a specific form of the improvement has been described and illustrated herein, it is desired to be understood that the same may be varied, within the scope of the appended claims, without departing from the spirit of the invention.

Having thus described the invention, what I claim and desire secured by Letters Patent is:—

1. The combination with an automobile chassis, of a series of four, upright, connected, angle posts fixed to said chassis; a second series of four, upright, connected, angle posts vertically slidable within said first series; a third series of four, upright, connected, angle posts vertically slidable within said second series; a hydraulic ram carried by said chassis; sheaves arranged to be raised by said ram; second sheaves fixed below said ram; third sheaves carried adjacent the top of said first series of upright posts; and a cable attached to said chassis at one extremity and passing over said first sheaves to a connection with said second series; and a two to one cable and sheave system between said second series and said first series.

2. The combination with an automobile chassis; of a series of four, upright, connected, angle posts fixed to said chassis; a second series of four, upright, connected, angle posts vertically slidable within said first series; a third series of four, upright, connected, angle posts vertically slidable within said second series; a hydraulic ram carried by said chassis; sheaves arranged to be raised by said ram; second sheaves fixed below said ram; third sheaves carried adjacent the top of said first series of upright posts; a cable attached to said chassis at one extremity and passing over said first sheaves to a connection with said second series; secondary cables attached at one extremity to said first series and at their other extremities to said third series; and sheaves for said secondary cables attached to and carried by said second series.

3. The combination with an automobile truck body having a floor, of a fixed frame; a movable frame arranged to slide vertically in said fixed frame and extend below said floor; a second movable frame adapted to slide within said first movable frame; a platform carried by said second movable frame and arranged to form a portion of said floor, when in one position; means for elevating said movable frames, said means comprising a hydraulic ram adapted to elevate a pair of sheaves; a second pair of sheave wheels secured on opposite sides of and adjacent the lower extremity of said fixed frame; a third pair of sheave wheels secured on opposite sides and adjacent the top of said fixed frame; and a pair of cables each fixed at its one extremity to said body and adapted to extend over the sheave wheels at opposite sides of said body, the opposite extremities of said cables being secured to said movable frame at opposite sides thereof.

4. The combination with an automobile truck body having a floor, of a fixed frame; a movable frame arranged to slide vertically in said fixed frame and extend below said floor; a second movable frame adapted to slide within said first movable frame; a platform carried by said second movable frame and arranged to form a portion of said floor, when in one position; means for elevating said movable frames, said means comprising a hydraulic ram adapted to elevate a pair of sheaves; a second pair of sheave wheels secured on opposite sides of and adjacent the lower extremity of said fixed frame; a third pair of sheave wheels secured on opposite sides and adjacent the top of said fixed frame; and a pair of cables each fixed at its one extremity to said body and adapted to extend over the sheave wheels at opposite sides of said body, the opposite extremities of said cables being secured to said movable frame at opposite sides thereof; other sheave wheels secured adjacent the top of said movable frame at opposite sides thereof; other cables arranged to pass over said other sheave wheels and be secured at their one extremity to said fixed frame and at their other extremity to said platform.

In testimony whereof, I affix my signature.

EARL J. KOFFORD.